(12) United States Patent
Olson et al.

(10) Patent No.: US 6,248,426 B1
(45) Date of Patent: Jun. 19, 2001

(54) CONSTRUCTION PAPER FOR CONSTRUCTING A THREE-DIMENSIONAL SHAPE FROM A PRINTABLE FOLDABLE SURFACE

(76) Inventors: Russell G. Olson, 134 West St., Columbia, CT (US) 06237; Joseph K. Barry, 36 Lawrence Ave., Avon, CT (US) 06001

( * ) Notice: Subject to any disclaimer, the term of this patent is extended or adjusted under 35 U.S.C. 154(b) by 0 days.

(21) Appl. No.: 09/320,489

(22) Filed: May 26, 1999

(51) Int. Cl.[7] ........................................ B32B 3/00
(52) U.S. Cl. .................. 428/195; 428/9; 428/12; 428/34.1; 428/174; 428/187; 428/542.2; 428/542.8; 493/405; 229/116.1; 446/488; 40/788; 273/157 R
(58) Field of Search .................. 428/542.8, 174, 428/187, 195, 34.1, 9, 15, 33, 12, 542.2; 493/356, 405, 162; 229/116.1, 186; 446/487, 488; 40/780, 788; 273/157 R

(56) References Cited

PUBLICATIONS

"The Ultimate Papercraft and Origami Book," Paul Jackson & Angela A'Court, 1992, pp. 206–207.

"Paper PhotoCube Software—NEW Version: 1.1" Publication Disclosure downloaded from the Internet at www.trivista.com/products/paperphotocube/, Mar. 21, 1999, 5 pages.

*Primary Examiner*—Deborah Jones
*Assistant Examiner*—Abraham Bahta
(74) *Attorney, Agent, or Firm*—Ware, Fressola, Van Der Sluys & Adolphson LLP

(57) ABSTRACT

A construction diagram affixed to a construction paper, for constructing a three-dimensional figure out of paper, or out of any other printable foldable surface, according to the principles of origami and papercraft. The construction diagram includes an image matrix and fold lines. The image matrix indicates what areas of the paper will be visible when the three-dimensional figure is constructed according to the construction diagram and the principles of origami, and the fold lines indicate how to fold the paper. Some of the fold lines may be truncated, depending on the shape of the paper used, compared to how long the fold lines would be if the paper were of a standard shape for the particular three-dimensional figure to be constructed. The result is a three-dimensional figure that is as large as could be constructed from the paper used.

18 Claims, 2 Drawing Sheets

CONSTRUCTION PAPER FOR CONSTRUCTING A THREE-DIMENSIONAL SHAPE FROM A PRINTABLE FOLDABLE SURFACE

BACKGROUND OF THE INVENTION

1. Technical Field

The present invention pertains to the field of origami and papercraft. More particularly, the present invention pertains to constructing three-dimensional shapes from paper, or more generally any printable and foldable surface, according to a plan, affixed to the paper, that indicates where on the paper to place images so as to be displayed on the visible surfaces of the constructed figure.

2. Description of Related Art

How to construct from paper a cubical shape, such as a so-called "waterbomb," is well known. For example, "The Ultimate Papercraft and Origami Book" by Paul Jackson and Angela A'Court, provides a description of how to construct a waterbomb starting with a square piece of paper and constructed by aligning edges and centerlines. The cubical shape that results is proportional in size to the single dimension of the square paper used to construct it. A piece of paper 8.5" on a side, which is as large a square piece of paper as can be produced from letter-size paper (i.e. paper of dimensions 8.5"×11"), will produce a cube approximately 2.125" on a side (vs. a cube 2.750" on a side for an 11"×11" square piece of paper).

What is not known is how to use essentially all of a piece of non-square paper, and so be able to produce a larger cube from letter-size paper. In addition, what is not shown in the prior art is how to indicate on a piece of non-square paper where to place images so as to end up displayed on a side of a cube constructed from essentially all of the paper.

What is needed more generally is a way of indicating how to construct a three-dimensional figure from a piece of paper (or any foldable printable surface) bearing images that end up on visible surfaces of the constructed figure. In addition, what is needed is a way of indicating how to use paper that is non-standard in shape, for example rectangular but non-square, in the construction of a cube, without simply cutting the paper to form a standard shape of paper (for example, cutting rectangular paper into square paper in case of constructing a cube).

SUMMARY OF THE INVENTION

Accordingly, the present invention provides a construction paper from which to construct, according to the principles of origami and papercraft, a three-dimensional figure having visible surfaces, the construction paper comprising: a piece of paper or more generally any piece of foldable material that can be used as a printing surface (including for example foldable transparency film used by laser printers and copy machines, such as is sometimes made using stress oriented polyethyleneterephthalate available under the trade designation "Mylar" from E.I. duPont deNemours Corp. of Wilmington, Del.); and a construction diagram, the construction diagram comprising an image matrix and fold lines, the image matrix for indicating what areas of the paper will end up on visible surfaces of the three-dimensional figure, and the fold lines for showing how to fold the paper to produce the three-dimensional figure; wherein an area indicated by the image matrix corresponds to either an entire visible surface or to part of a visible surface, and if to part of a visible surface, the area is folded into an orientation so as to unite with other areas of the image matrix and so provide an entire visible surface.

In another aspect of the invention, the paper is non-standard, in that it is different in shape than the paper that would normally be used to construct the intended three-dimensional figure, and some fold lines are truncated, i.e. are truncated based on the difference between the paper used and the standard paper, so as to adapt the non-standard paper to a standard paper corresponding in size to the larger dimension of the non-standard paper.

In a particular embodiment, the three-dimensional shape is substantially a cube. In that embodiment, the standard paper is square, and in truncating fold lines of non-standard (non-square rectangular) paper, some fold lines are truncated and the paper is folded as if it were square in shape having as the length of any side the larger length of the non-standard paper. The result is a cube as large as could be constructed from a square piece of paper with each side having a length equal to the greater of the two lengths of the non-standard (non-square rectangular) paper.

Sometimes it is preferable to trim some of the paper beyond the construction diagram, depending on the dimensions of the paper. Usually, the excess is removed from the two ends of the longer dimension of the paper.

The construction paper of the present invention can be created for the most part on a computer, or on different computers connected by a network. Ultimately, however, when a tangible construction paper is produced, if color pictures are to be affixed to any areas of the image matrix, the construction paper is preferably produced by printing the construction diagram on paper, or any other printable and foldable printable surface, using a color printer.

BRIEF DESCRIPTION OF THE DRAWINGS

Other features and advantages of the invention will become apparent from a consideration of the subsequent detailed description presented in connection with accompanying drawings, in which.

BEST MODE FOR CARRYING OUT THE INVENTION

Figure 1:
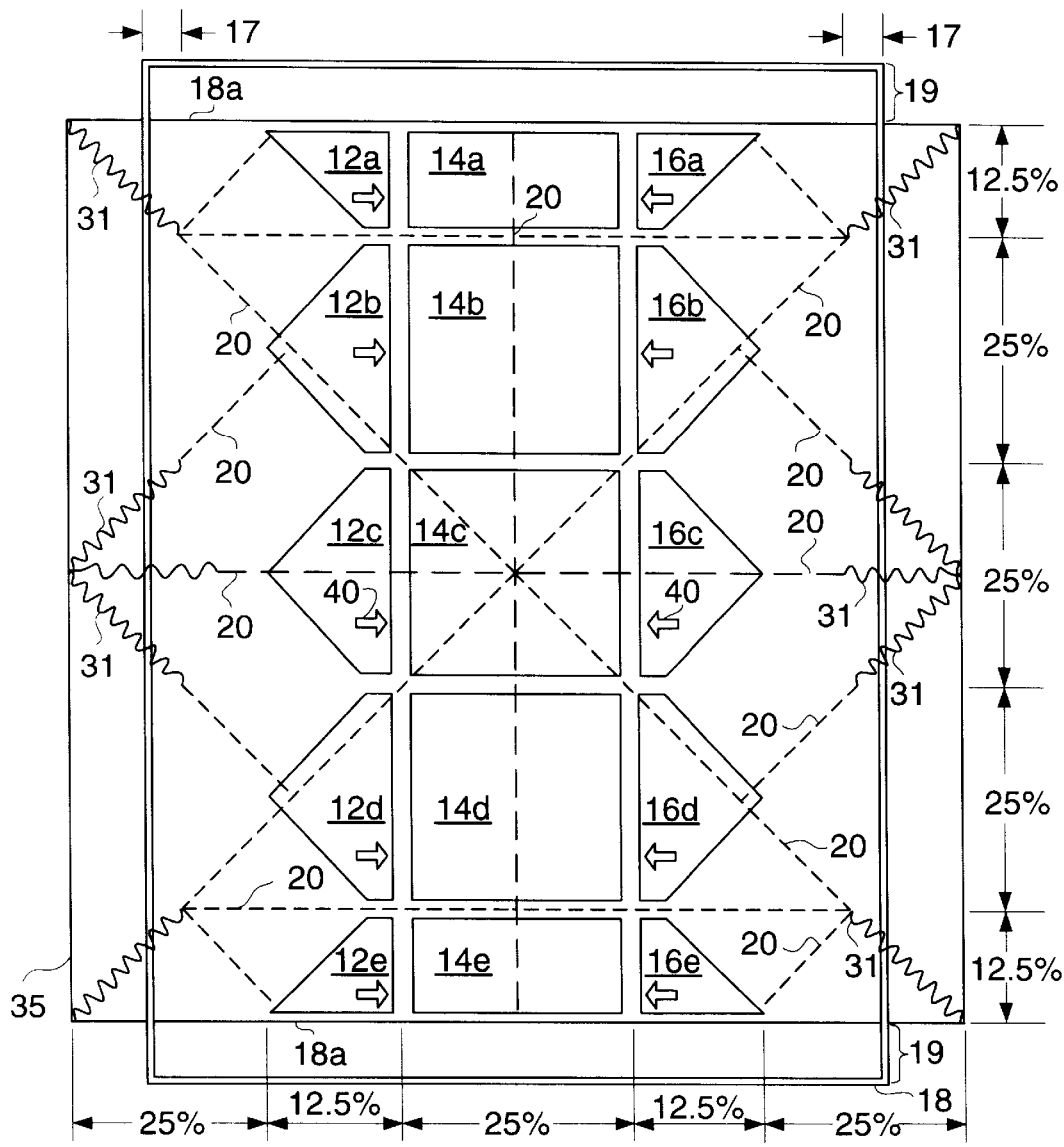
FIG. 1 is a drawing of a construction diagram for use in constructing a cube from rectangular, non-square paper.

Referring now to FIG. 1, in the best mode, a construction paper according to the present invention is provided on a piece of rectangular, non-square paper 11, for constructing what is substantially a cube. A construction paper consists of a piece of paper on which is affixed a construction diagram for indicating how to fold the paper to create a three-dimensional figure, which in the preferred embodiment, is substantially a cube. The construction diagram consists of fold lines (dashed lines 20), and an image matrix indicating on the paper areas (12a–e, 14a–e, and 16a–e) what will end up as visible surfaces on the cube constructed according to the construction diagram. The five areas 12a–e of the image matrix unite to form one visible surface (face) of the cube. Similarly, the five areas 16a–e also unite to form a second visible surface of the cube, and areas 14a and 14e of the image matrix unite to form a third visible surface of the cube. Areas 14b, 14c and 14d each, independently, form a visible surface of the cube.

According to the prior art, a square piece of paper would be used to construct a cube. See, for example, "The Ultimate Papercraft and Origami" book, by Paul Jackson and Angela A'Court, mentioned above. The problem with having to use square paper is that most paper is not square, and cutting one side down of the rectangular piece of paper to make a square piece of paper wastes a lot of the paper. In addition, the three-dimensional constructed in the cutting-to-square approach is only as large as the shorter length of the rectangular paper used as a starting point.

In order to avoid these shortcomings, the present invention, in the best mode, uses a rectangular, i.e., non-square, piece of paper 18 on which to provide a construction diagram. In the case of letter-size paper, the construction diagram includes cut-lines 18*a* at the top and bottom of the paper 18. These cut-lines are provided to indicate trimming a certain amount of excess 19. (This excess trimming is not necessary but is performed in the best mode because printers do not always print to the extreme edges of paper, and because trimming the excess allows a construction diagram leaving adequate tucking paper 17, i.e., enough paper for tucking between folds and so holding the cube together.)

Instead of cutting the paper square, the construction diagram of the present invention provides fold lines 20, which, if continued, provide virtual fold lines 31 (wiggly lines) extending out from the rectangular real paper onto a wider, imaginary square piece of paper 35. (The virtual fold lines 31 are indicated only for illustration. They do not appear as part of the construction diagram, and in fact cannot appear because they exist only on an imaginary extension of the real paper or printable foldable surface. They can appear, and indeed it is sometimes advantageous to indicate them, in a computer view of the construction diagram, a view that could indicate both the imaginary, square piece of paper with borders 35, as well as the real piece of paper 18.)

Using the virtual-fold-line approach, instead of the cutting-to-square approach, results in a construction diagram that indicates folding a rectangular piece of paper 18 as if it were a square piece of paper 35 and of dimension equal to the larger of the two rectangular dimensions.

If the construction paper uses letter/A4 paper (8.5" by 11"/210 mm by 297 mm), it is preferred to indicate trimming excess 19 by cut-lines 18*a*, so that the total excess removed is approximately 0.5"/27 mm respectively.

In another aspect of the present invention, pictures are affixed to the image matrix areas, one picture per each of the areas 14*b–d*, and one picture fragmented and the fragments arranged over uniting areas 14*a* and 14*e;* another picture fragmented and the fragments arranged over uniting areas 12*a–e;* and a final picture fragmented and the fragments arranged over uniting areas 16*a–e*.

Figure 2:
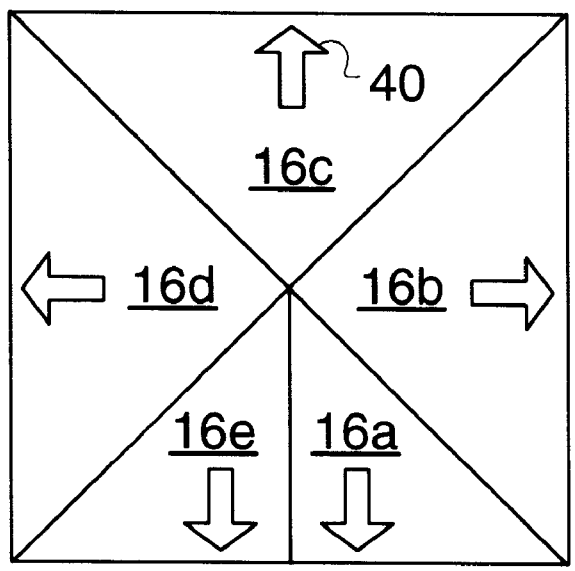
FIG. 2 shows how some areas of the paper, indicated on the construction diagram, unite to become a single visible surface, i.e. a face, of the constructed cube.

Affixing the pictures to the image matrix areas is straightforward in case of the areas 14*a–e,* remembering that areas 14*a* and 14*e* unite to form a single side of the cube (with the uppermost edge of area 14*a* ending up adjacent the lowermost edge of area 14*e*), but for how to arrange the five fragments of each of the pictures over areas 12*a–e* and 16*a–e* so as to properly unite, reference should be made to FIG. 2, which shows, by reference to the orienting arrows 40, how areas 16*a–e* end up uniting as one visible surface of a cube. (The areas 12*a–e* unite in the same way.)

As can be seen from FIG. 1, the construction diagram of the present invention is best understood in terms of how its fold lines 20 intersect at certain points on the paper, as indicated by reference to the fractional spans of the paper marked in both extents, i.e., the 12.5% and 25% fractional extents shown along both dimensions (width and height) of the virtual square paper 35.

Figure 3:
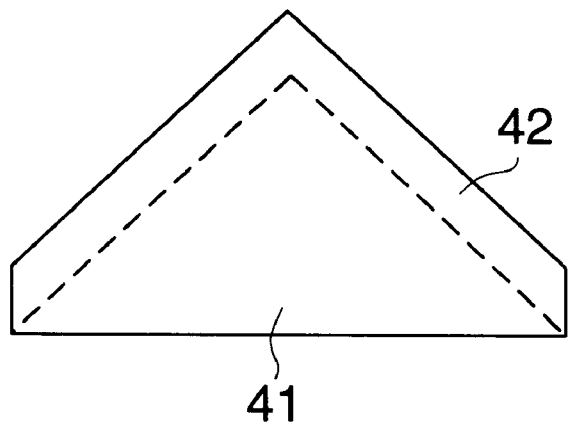

In the best mode, each of the uniting areas 12*a–e* and 16*a–e* is pentagonal, not triangular. Referring now to FIG. 3, what ends up as visible is the included triangular area 41 of each area, not the remnant area 42. The remnant area 42 ends up folded underneath.

The fold lines 20 of FIG. 1 are shown extending through areas of the image matrix (12*a–e,* 14*a–e,* and 16*a–e*). In some embodiments, especially when pictures are affixed to the image matrix areas, the fold lines are intermittent, and are shown leading up to an image matrix area, but not shown in the area itself.

The same techniques used in constructing a construction diagram for a cube can be used in constructing a construction diagram for any three dimensional figure. To develop a construction diagram for any three dimensional figure, one begins with the standard paper used in constructing the three dimensional figure. Often this is square paper, but could be any paper of any shape and could even be several pieces of paper each of the same or a different shape. One then constructs the three dimensional figure, and then indicates on the figure (by somehow marking the paper, such as with a marking pen) what areas of the standard paper end up as visible surfaces. One then unfolds the paper and indicates where the paper was folded. In the preferred embodiment, one would indicate on the construction diagram for the three-dimensional figure whether the paper was folded so as to end up with the image side inside a fold, or outside a fold.

In some cases, the construction diagram must be provided on both sides of the paper (or other printable foldable planar surface), and can even be provided on more than one side of several different pieces of paper. It is preferred that such a construction paper be provided by feeding one side of each paper constituting the construction paper into a printer, printing all of one side of the construction paper, then turning the same individual pieces of paper over and feeding them again into the printer and printing the other side of the construction paper.

If the standard paper used in constructing the three dimensional figure is the shape and size paper desired for the construction diagram, typically letter size or A4 size paper, then the construction diagram is already complete. If, however, the standard paper is different in shape or size than the desired size paper, then the standard paper must be adapted to the desired size paper. To adapt to a different size but the same shape, the construction diagram is simply scaled up or down in size.

To adapt to a different shape, however, involves using virtual fold lines, according to the present invention (or cutting the paper into the standard shape, in the case of the prior art). According to the present invention, adapting the construction diagram to a desired size paper of a different shape is done by placing the construction diagram affixed to the standard paper, of appropriate size, on top of the desired size paper. Any standard paper is standard only in shape, not in absolute dimensions, i.e. size, and the dimensions of the standard paper should be pre-selected so that the size of the standard paper is as close as is appropriate to the that of the desired size paper.

After placing the construction diagram affixed to an appropriately sized standard paper on top of a desired size paper, one notes the location of the cut lines 18*a* and where the fold lines 20 should stop, this determined by noting where their continuation would be only virtual (not actual) because the desired-size paper is smaller in one dimension than the standard paper of appropriate size. This procedure results in a construction diagram on a desired size paper that produces a three-dimensional figure larger than can be produced by cutting one of the dimensions of the desired size paper down in size to that of the appropriately sized standard paper.

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A construction paper from which to construct, according to principles of origami, a three-dimensional figure having visible surfaces, the construction paper including:
    a) a printable surface; and
    b) a construction diagram affixed to the printable surface, the construction diagram comprising an image matrix and fold lines, the image matrix for indicating areas of the printable surface that will end up on visible surfaces of the three-dimensional figure thereby indicating where to place images so as to end up displayed, and the fold lines for showing how to fold the construction paper to produce the three-dimensional figure,
wherein an area indicated by the image matrix corresponds to either an entire visible surface or to part of a visible surface, and if to part of a visible surface, the area is folded into an orientation so as to unite with other areas of the image matrix and so provide an entire visible surface.

2. The construction paper of claim 1, wherein the printable surface is non-standard, and wherein some fold lines are truncated so as to adapt this non-standard printable surface to produce a three-dimensional figure larger than by cutting the construction paper down in size to that of standard paper.

3. The construction paper of claim 1, wherein the three-dimensional figure is substantially a cube.

4. The construction paper of claim 3, wherein the printable surface is rectangular but not square, and wherein the cube to be produced according to the construction diagram is as large as could have been constructed from a square piece of paper with each side having a length equal to the greater of the two lengths of the rectangular printable surface.

5. The construction paper of claim 4, further wherein the printable surface has been trimmed of excess beyond the construction diagram, the excess having been removed from the two ends of the longer dimension of the printable surface.

6. The construction paper of claim 5, wherein the printable surface is 8½" by 11", and the excess trimmed from the printable surface is approximately ¼" from each of the two ends of the longer dimension of the printable surface, leaving behind a printable surface of approximate dimensions 8½" by 10½", so that the truncation of the fold lines effectively eliminates one inch from either end of the shorter dimension of the printable surface.

7. The construction paper of claim 5, wherein the printable surface is 210 mm by 297 mm, and the excess trimmed from the printable surface is approximately 13.5 mm from each of the two ends of the longer dimension of the printable surface, leaving behind a printable surface of approximate dimensions 210 mm by 260 mm, so that the truncation of the fold lines effectively eliminates approximately 25 mm from either end of the shorter dimension of the printable surface.

8. The construction paper of claim 1 further comprising a picture associated with at least one of the visible surfaces of the three-dimensional figure, as indicated by the image matrix, wherein the picture is arranged on the construction diagram, according to the image matrix, either integrally or else fragmented so that the fragments of the picture unite when the three-dimensional picture is constructed according to the construction diagram.

9. A construction paper out of which to construct a cube according to the principles of origami, the construction paper comprising:
    a) a printable surface that is rectangular and non-square;
    b) a construction diagram affixed to the printable surface and indicating what regions of the printable surface will become faces of the cube, wherein some faces are each made up of a respective unbroken region of the printable surface, and some other faces are each made up of a respective plurality of components of a broken region; and
    c) fold lines affixed to the printable surface for showing how to fold the construction paper in constructing the cube,
wherein the construction diagram provides, by means of truncated fold lines, a cube as large as could have been constructed from a square piece of paper with each side having a length equal to the greater of the two lengths of the rectangular printable surface.

10. The construction paper of claim 9, further comprising a picture arranged on and affixed to the printable surface, according to the construction diagram, so as to end up as a visible face of the cube, the picture arranged in one piece or in fragments which unite to form a single side of the cube.

11. The construction paper of claim 9, further wherein the printable surface is trimmed of excess beyond the construction diagram, the excess having been removed from the two ends of the longer dimension of the printable surface.

12. The construction paper of claim 11, wherein the printable surface is 8½" by 11", and the excess trimmed from the printable surface is approximately ¼" from each of the two ends of the longer dimension of the printable surface, leaving behind a printable surface of approximate dimensions 8½" by 10½", so that the truncation of the fold lines effectively eliminates one inch from either end of the shorter dimension of the printable surface.

13. The construction paper of claim 11, wherein the printable surface is 210 mm by 297 mm, and the excess trimmed from the printable surface is approximately 13.5 mm from each of the two ends of the longer dimension of the printable surface, leaving behind a printable surface of approximate dimensions 210 mm by 260 mm, so that the truncation of the fold lines effectively eliminates approximately 25 mm from either end of the shorter dimension of the printable surface.

14. A construction diagram for affixing to a planar printable surface, comprising an image matrix and fold lines, the image matrix for indicating what areas of the planar printable surface will end up on visible surfaces of a three-dimensional figure thereby indicating where to place images so as to end up displayed, and the fold lines for showing how to fold the planar printable surface to produce the three-dimensional figure, wherein an area indicated by the image matrix corresponds to either an entire visible surface or to part of a visible surface, and if to part of a visible surface, the area is folded into an orientation so as to unite with other areas of the image matrix and so provide an entire visible surface.

15. The construction diagram of claim 14, wherein the planar printable surface is non-standard, and wherein some fold lines are truncated so as to adapt this non-standard planar printable surface to produce a three-dimensional figure larger than by cutting the construction paper down in size to that of standard paper.

16. The construction diagram of claim 14, wherein the three-dimensional shape is a cube.

17. The construction diagram of claim 16, wherein the planar printable surface is rectangular but not square, and wherein the cube to be produced according to the construction diagram is as large as could have been constructed from a square piece of paper with each side having a length equal to the greater of the two lengths of the rectangular planar printable surface.

18. The construction paper of claim 1, wherein the printable surface is planar.

* * * * *